United States Patent [19]

Grubbs et al.

[11] Patent Number: 5,484,583
[45] Date of Patent: Jan. 16, 1996

[54] FILLER MATERIAL CONTAINING AN ANION SUBSTITUTED HYDROTALCITE

[75] Inventors: Donald K. Grubbs, Rector; Peter E. Valente, III, Apollo, both of Pa.

[73] Assignee: Aluminum Company of America, Pittsburgh, Pa.

[21] Appl. No.: 278,581

[22] Filed: Jul. 21, 1994

Related U.S. Application Data

[63] Continuation of Ser. No. 928,748, Aug. 13, 1992, Pat. No. 5,362,457.

[51] Int. Cl.$^6$ .................................................. C01B 31/30
[52] U.S. Cl. .................................. 423/420.2; 524/436
[58] Field of Search .................................. 423/332, 463, 423/554, 555, 277, 420.2

[56] References Cited

U.S. PATENT DOCUMENTS

| | | |
|---|---|---|
| 3,573,006 | 3/1971 | Shih . |
| 3,878,166 | 4/1975 | Woycheshin et al. . |
| 4,085,088 | 4/1978 | Miyata et al. . |
| 4,351,814 | 9/1982 | Miyata et al. . |
| 4,373,039 | 2/1983 | Mueller et al. . |
| 4,379,882 | 4/1983 | Miyata . |
| 4,392,979 | 7/1983 | Lee et al. . |
| 4,400,297 | 8/1983 | Cruz, Jr. . |
| 4,515,633 | 5/1985 | Cruz, Jr. . |
| 4,539,195 | 9/1985 | Schanz et al. . |
| 4,600,634 | 7/1986 | Langer . |
| 4,639,362 | 1/1987 | Schanz . |
| 4,710,528 | 12/1987 | Bertelli et al. . |
| 4,729,854 | 3/1988 | Miyata et al. . |
| 4,801,639 | 1/1989 | Hoshi et al. . |
| 4,883,533 | 11/1989 | Kosin et al. . |
| 4,904,457 | 2/1990 | Misra . |
| 4,963,608 | 10/1990 | Kunieda et al. . |
| 5,055,199 | 10/1991 | O'Neill et al. . |
| 5,068,095 | 11/1991 | Nigro et al. . |
| 5,075,089 | 12/1991 | Misra et al. ............ 423/332 |
| 5,142,077 | 8/1992 | Martin et al. . |
| 5,250,279 | 10/1993 | Preston et al. ............ 423/432 |
| 5,362,457 | 11/1994 | Grubbs et al. ............ 423/420.2 |

FOREIGN PATENT DOCUMENTS 1198675  12/1985  Canada .

OTHER PUBLICATIONS

Kirk–Othmer Encyclopedia of Chemical Technology, 3rd Ed., vol. 14 (1983), pp. 629–633.

Primary Examiner—Wayne Langel
Attorney, Agent, or Firm—David W. Pearce-Smith

[57] ABSTRACT

An anion intercalated hydrotalcite filler material for polymer and paper systems. The filler material is formed by a method which includes reacting an activated magnesia with an aqueous solution of aluminate, anion, such as bromide, chloride, sulfate, borate and combinations thereof and hydroxyl ions. The method can be carried out at atmospheric pressure to form hydrotalcite in high purity and high yield. In a preferred embodiment of the invention, the aluminate solution is formed from sodium aluminate, sodium bromide and sodium hydroxide and the aqueous solution is substantially carbonate free. Other anion intercalated hydrotalcites can also be produced by the method of the present invention.

8 Claims, No Drawings

FILLER MATERIAL CONTAINING AN ANION SUBSTITUTED HYDROTALCITE

This application is a continuation of application Ser. No. 07/928,748 filed Aug. 13, 1992, U.S. Pat. No. 5,362,457.

FIELD OF THE INVENTION

The present invention relates to a method for producing synthetic hydrotalcite. More particularly, the invention is directed to methods for the direct synthesis of anion substituted hydrotalcite.

BACKGROUND OF THE INVENTION

Hydrotalcite is a naturally occurring mineral having the formula $6 MgO.Al_2O_3.CO_2.12H_2O$ or $Mg_6Al_2(OH)_{16}CO_3.4H_2O$. Known deposits of natural hydrotalcite are very limited and total only about 2,000 or 3,000 tons in the whole world. Natural hydrotalcite has been found in Snarum, Norway and in the Ural Mountains. Typical occurrences are in the form of serpentines, in talc schists, and as an alteration product of spinel where, in some cases, hydrotalcite has formed as pseudomorphs after spinel.

The upper stability temperature of hydrotalcite is lower than the lower limit for spinel. Spinel and hydrotalcite theoretically never would appear together in stable condition. If equilibrium has been established, the spinel would be completely changed to hydrotalcite. However, naturally occurring hydrotalcite is intermeshed with spinel and other materials.

Natural hydrotalcite is not present as pure product and always contains other minerals such as penninite and muscovite and potentially undesirable minerals such as heavy metals. Conventional practice recognizes that it is practically impossible to remove such impurities from a natural hydrotalcite.

Previous attempts to synthesize hydrotalcite have included adding dry ice or ammonium carbonate (a) to a mixture of magnesium oxide and alpha-alumina or (b) to a thermal decomposition product from a mixture of magnesium nitrate and aluminum nitrate and thereafter maintaining the system at temperatures below 325° C. at elevated pressures of 2,000–20,000 psi. Such a process is not practical for industrial scale production of synthetic hydrotalcite by reason of the high pressures. Furthermore, the high pressure process forms substances other than hydrotalcite, such as brucite, boehmite, diaspore, and hydromagnesite.

There is increasing interest in anion substituted hydrotalcite. U.S. Pat. No. 4,883,533, issued to Kosin et al discloses a modified synthetic hydrotalcite. The patent teaches forming a synthetic hydrotalcite from a slurry of $Mg(OH)_2$, sodium aluminate and $NaHCO_3$. The synthetic hydrotalcite is then reslurried in water with phosphoric acid. The acid was added until all of the carbon dioxide was liberated.

Canadian Patent 1,198,675 issued to Buehler, discloses a method of forming hydrotalcite-like complexes which include $Mg_6Al_2(OH)_{14}(HPO_4).4H_2O$ and $Mg_6Al_2(OH)_{14}(SO_4).4H_2O$. The material is formed by first forming a hydrotalcite structure from a suspension including aluminum hydroxide and magnesium hydroxide and then intercalating with either $K_2HPO_4$ or $NaHSO_4$.

It is an object of the present invention to produce synthetic anion substituted hydrotalcite in high purity by direct synthesis from alumina and magnesia as opposed to the indirect synthesis where hydrotalcite is first formed and then the anions substituted in the hydrotalcite structure (indirect synthesis).

It is another object of this invention to produce synthetic anion substituted hydrotalcite in high yield at atmospheric pressure.

Yet another object of this invention is a low cost method for producing synthetic anion substituted hydrotalcite.

Another object of this invention is a method for producing synthetic anion substituted hydrotalcite which does not require calcining of hydrotalcite to remove its carbonate.

Still another object of this invention is a method for producing synthetic anion substituted hydrotalcite which does not require reslurrying hydrotalcite to intercalate the anion.

Additional objects and advantages of the present invention will be more fully understood and appreciated with reference to the following description.

SUMMARY OF THE INVENTION

The present invention includes reacting an activated magnesia with an aqueous solution of aluminate, hydroxyl ions, and the anions which will form the anion substituted hydrotalcite. The method can be carried out at atmospheric pressure to form hydrotalcite in high purity and high yield.

In a preferred embodiment of the invention, the aluminate is sodium aluminate and the aqueous solution is substantially carbonate free. The anions are preferably selected from the group consisting of bromide, chloride, sulfate, borate and combinations thereof.

In a preferred embodiment of the invention, the method of producing anion substituted hydrotalcite includes forming a substantially carbonate free aqueous slurry from magnesium oxide, sodium aluminate and sodium bromide, heating the slurry to a temperature of at least about 80° C. at atmospheric pressure. The temperature is maintained until the reaction is essentially complete. If the slurry is held under pressure at a temperature of 150° C., two hours is sufficient time for the reaction to essentially go to completion. Afterwards, the slurry is filtered to form a filter cake of anion substituted hydrotalcite. The filter cake is then reslurried and the reslurry is spray dried.

DETAILED DESCRIPTION

The present invention produces synthetic anion substituted hydrotalcite by direct synthesis of the material. The direct synthesis route is much simpler than the indirect method and involves fewer steps. In the indirect method, the hydrotalcite is first formed by adding magnesia to Bayer plant liquor or a sodium aluminate solution. Afterwards the slurry is filtered and washed. The filter cake is spray dried and then activated at elevated temperatures (e.g. 500° C. for 1–4 hours). The activated hydrotalcite is added to a hot sodium bromide solution which is blanketed with an inert gas (usually nitrogen) to prevent carbonation of the alkaline NaBr solution. The slurry is filtered and excess soda ($Na_2O$) is washed from the filter cake. The filter cake is then reslurried and spray dried to form a commercial product.

In contrast, the direct synthesis is accomplished by reacting magnesium oxide with an aqueous solution of aluminate and hydroxyl ions also containing anions selected from the group consisting of bromide, chloride, sulfate, borate and combinations thereof. Afterwards the slurry is filtered and excess soda ($Na_2O$) is washed from the filter cake. The filter cake is then reslurried and spray dried.

In addition to being a much simpler method, the direct synthesis method of the present invention is also more cost effective than the indirect synthesis route. As discussed above, the direct synthesis route of the present invention requires only one filtering and washing rather than two filtering and washings in the indirect synthesis method. The reduction in filtering steps results in a substantial cost savings in terms of a reduced amount of water required. There are also savings in the amount of energy required for filtration and the amount of man-hours required per pound of product. Similar savings are derived from the fact that the material is spray dried only once; thus achieving additional savings in energy and man-hours required per pound of product. Furthermore, no capital investment is needed for installation of thermal activation equipment.

In the direct synthesis method of the present invention, the MgO, which is used to produce hydrotalcite, must be activated MgO if a high purity anion substituted hydrotalcite product is to be produced. Otherwise, i.e., in the event that an unactivated MgO (e.g. $Mg(OH)_2$ or deadburned MgO) is used, the resulting product will include substantial amounts of unreacted magnesium oxide minerals.

Commercially available activated magnesia can be used, e.g. MagChem 35, which is a product of Martin Marrietta Company, and M-3494, which is a product of Fischer Scientific Company, have been found useful in practicing the present invention. Alternatively, activated MgO can be formed by calcining magnesium compounds such as magnesium carbonate or magnesium hydroxide at temperatures of between about 500° and about 900° C. If the material is calcined at temperatures below about 500° C., the magnesium salt will not activate sufficiently and the reaction will not go to completion leaving behind unreacted material that could be detrimental to the process of the invention. Calcining at temperatures above about 900° C., the resulting magnesium oxide takes on a form is insufficiently active to form hydrotalcites and can be characterized as dead burned. Such a form of MgO will not form hydrotalcite predominantly over other mineral forms. The insufficiently active form of magnesia which is nonspecific to forming hydrotalcite will be avoided by heating the magnesium salt starting materials to elevated activating temperatures, but which must not exceed about 900° C., to form the activated magnesia or magnesium oxide (MgO).

The activated magnesium oxide is added to a solution containing ions of aluminate, hydroxyl and anions selected from the group consisting of bromide, chloride, sulfate, borate and combinations thereof. The anion(s) used will depend on the desired anion substituted hydrotalcite. For example, if a bromide intercalated hydrotalcite is desired, a suitable solution may contain sodium hydroxide, sodium aluminate and sodium bromide.

By way of example, 5–100 grams per liter of activated MgO can be added to 100–250 g/l NaOH, 50–150 g/l $Al_2O_3$ in an aqueous solution containing 25–100 g/l NaBr. Alternately, other salts such as NaCl, $Na_2SO_4$, $Na_2B_2O_3$ can also be used, in combination or as a substitution, to provide concentrations approximately equivalent to $Br^-$ noted above. The mixture should be agitated at a temperature of about 80° to about 100° C. under atmospheric pressure for a time of about 20 to about 120 minutes.

Other magnesium compounds can be used in the direct synthesis process of the present invention. However, these materials may contain other anions which will compete with the anions in solution for incorporation into the hydrotalcite structure.

After completion of the synthesis, the remaining reaction solution is removed by filtration and washing the solid product. The method used to filter the slurry is not considered to be critical to practicing the invention. Conventional filtering methods which are well known in the art such as filter pressing to form a filter cake of anion substituted hydrotalcite may be employed. The filter cake is then reslurried to prepare it as a feed material for a spray drier. Then a spray drier may be used to reduce the slurry to a granulated material. The method used to dry the anion substituted hydrotalcite is not considered to be critical to practicing the invention.

The crystal size of the resulting intercalated hydrotalcite is dependent upon the crystal size of the initial MgO used.

The process of the present invention produces synthetic anion substituted hydrotalcite in high yield. The term "high yield" is used herein to mean a conversion yield greater than about 90% and preferably greater than about 95%.

High purity in the context of the present invention is established by the absence (or low level) of diffraction lines attributable to compounds other than the anion substituted hydrotalcite. The percent of anion in the final product as determined by chemical analysis. The lack of diffraction lines indicates that other compounds such as MgO and $Mg(OH)_2$ are not present in any significant amount.

The following examples illustrate the preferred method of practicing the present invention and the advantage of the present invention over the prior art.

EXAMPLE 1

(prior Art)

Synthetic hydrotalcite material ($Mg_6Al_2(OH)_{16}CO_3.4H_2O$) was first formed by adding magnesium oxide to Bayer Process plant liquor. The median particle size of the MgO was 0.5 micrometers. Afterwards the slurry was filtered, washed and spray dried. The hydrotalcite was then activated at elevated temperatures by heating (calcining) to 500° C. for 4 hours to drive off most of its hydroxyl and carbonate groups. The activated hydrotalcite was an alumina substituted magnesia (activated hydrotalcite).

The activated hydrotalcite was immediately placed in a vessel containing 15 liters of a 50 grams per liter solution of sodium bromide (NaBr) which was blanketed with nitrogen gas to prevent carbonation of the alkaline NaBr solution. The NaBr solution was heated to 95° C. under atmospheric pressure to intercalate bromide ions into the lattice structure of the hydrotalcite.

After four hours, the slurry containing the bromide intercalated hydrotalcite was removed from the vessel. The slurry was filtered in a plate and frame filter press and washed to remove the excess soda from the filter cake. The washed filter cake was reslurried and spray dried to form a granulated product.

The median particle size of the resulting material was 3 micrometers. The Br content of the spray dried product was determined to be 11.4 wt. %. The total carbon content was determined to be 1.20 wt. %. X-ray diffraction analysis of material confirmed that the product was a mixture of bromide and carbonate intercalated hydrotalcite. X-ray diffraction analysis of material is as follows:

| D-Spacing | Intensity |
|---|---|
| 7.75 | 100.0 |
| 4.00 | 40.5 |
| 3.84 | 38.5 |
| 2.58 | 29.5 |
| 2.30 | 22.0 |
| 1.96 | 10.6 |
| 1.53 | 21.8 |
| 1.50 | 13.4 |

EXAMPLE 2

A sample of a bromide-intercalated hydrotalcite prepared in Example 1 was used as a filler in polypropylene. The bromide-intercalated hydrotalcite was used at 55, 60 and 63 wt. % loadings. Oxygen index and vertical burn testing were performed on a specimen taken from each sample. Oxygen index is a flammability test for plastics, ASTM D-2863-74. This method describes a procedure for determining the relative flammability of cellular plastics by measuring the minimum concentration of oxygen in a slowly rising mixture of oxygen and nitrogen that will just support combustion. The higher the oxygen index required, the more flame retardant the material is considered to be in a fire.

The vertical burn test used is ANSI/UL 94-1985 which is a standard test for flammability of plastic materials that has been developed by Underwriters Laboratories Inc. for American National Standard Institute. The meanings of the vertical burn ratings used in ANSI/UL 94-1985 are as follows:

V-2—indicates that the total flaming combustion time for 5 samples is less than 250 seconds and no single sample can burn for more than 30 seconds. Flaming drips from the sample are permitted. Glowing combustion may not persist in any sample for more the 60 seconds after removal of the flame.

V-1—indicates that the total flaming combustion time for 5 samples is less than 250 seconds and no single sample can burn for more than 30 seconds. No flaming drips from the sample are permitted. Glowing combustion may not persist in any sample for more than 60 seconds after removal of the flame.

V-0—indicates that the total flaming combustion time for 5 samples is less than 50 seconds and no single sample can burn for more than 10 seconds. No flaming drips from the sample are permitted. Glowing combustion may not persist in any sample for more than 30 seconds after removal of the flame.

Failed—indicates that the sample does not meet at least the V-2 criteria.

The oxygen index and vertical burn values for polypropylene containing bromide-intercalated hydrotalcite at the various loading levels are as follows:

| % Loading | Oxygen Index | Vertical Burn |
|---|---|---|
| 55% | 26.8 | V-1 |
| 60% | 29.2 | V-0 |
| 63% | 30.4 | V-0 |

Bromide intercalated hydrotalcite was prepared via direct synthesis from an aqueous solution of NaOH, NaAlO$_2$ and NaBr. The solution was formed by dissolving 16.98 kilograms of NaOH, 11.47 kilograms of Al(OH)$_3$ and 37.40 kilograms of NaBr in 150 liters of deionized water. This solution was stirred at 300 rpm and purged with nitrogen gas while heating to 95° C. in an open tank. When the solution reached 95° C., 6.81 kilograms of MgO with a median particle size of 4 micrometers was introduced. The stirred slurry was held at 95° C. under atmospheric pressure for 24 hours with the nitrogen purge continuing during the entire synthesis.

After 24 hours, the slurry was pumped to a pressure filter to remove the product from the solution. The filter cake was washed with hot deionized water and dried overnight at 110°C. The weight of the dry product was approximately 14.50 kilograms.

The median particle size of the resulting material was 7 micrometers. The Br content of the spray dried product was determined to be 11.3 wt. %. The total carbon content of the material was 1.15 wt. %. X-ray diffraction analysis of material confirmed that the product was a mixture of bromide and carbonate intercalated hydrotalcite. X ray diffraction analysis of material is as follows:

| D-Spacing | Intensity |
|---|---|
| 7.79 | 100.0 |
| 3.99 | 35.5 |
| 3.88 | 33.5 |
| 2.59 | 30.5 |
| 2.31 | 20.2 |
| 1.95 | 8.1 |
| 1.53 | 22.8 |
| 1.50 | 18.3 |

EXAMPLE 4

A sample of a bromide-intercalated hydrotalcite prepared in Example 3 was used as a filler in polypropylene. The bromide-intercalated hydrotalcite was used at 55, 60 and 63 wt. % loadings. Oxygen index and vertical burn testing was performed on a specimen taken from each sample.

The oxygen index and vertical burn values for polypropylene containing bromide-intercalated hydrotalcite at the various loading levels are as follows:

| % Loading | Oxygen Index | Vertical Burn |
|---|---|---|
| 55% | 26.7 | V-0 |
| 60% | 29.8 | V-0 |
| 63% | 30.4 | V-0 |

EXAMPLE 5

Bromide intercalated hydrotalcite was prepared via direct synthesis from an aqueous solution formed by mixing 1 liter double deionized water, 139 grams Na$_2$O.Al$_2$O$_3$.3H$_2$O, 117 grams NaOH, 155 grams NaBr and 40 grams Fisher Scientific M-3494 MgO in an autoclave. All of the solid reagents were added to the reactor. The reactor was sealed and purged with 1 liter/minute argon while being stirred at 300 rpm. The heater was turned on and the reactor was purged with argon until the temperature reached 80° C. The purge outlet port was closed at 80° C. and the inlet port was closed. The stirred slurry was held at 130° C. under a pressure of 40 pounds per square inch for 2 hours.

After 2 hours, the heater was turned off and the reactor was cooled to room temperature. The slurry was filtered on a vacuum filter and washed with hot deionized water. The filter cake was dried overnight at 110° C. The weight of the dry product was 89.27 grams.

The resulting material Was analyzed and the Br content of the spray dried product was determined by chemical analysis to be 11.8 wt. %. X-ray diffraction analysis of material confirmed that the product was a mixture of bromide and carbonate intercalated hydrotalcite. The overall shift in the location of they X-ray diffraction pattern peaks, and the change in the relative intensity of the peaks near 4.0 Å is caused by an increase in the crystallinity of the bromide portion of the product at the expense of the Carbonate portion. X-ray diffraction analysis of material is as follows:

| D-Spacing | Intensity |
| --- | --- |
| 8.09 | 100.0 |
| 4.07 | 72.1 |
| 3.97 | 15.3 |
| 2.61 | 18.8 |
| 2.36 | 16.2 |
| 2.01 | 6.6 |
| 1.53 | 21.0 |
| 1.50 | 14.7 |

Although the invention has been described in terms of a bromide substituted hydrotalcite, it is contemplated that other anion substituted hydrotalcites may be formed in practicing the present invention. Other anion salts include, but are not limited to chloride, borate, sulfate ions and combinations thereof.

In addition, it is contemplated that the anion substituted material of the present invention will be useful as a filler material for polymer systems. The material of the present invention will find particular utility in polymer systems that require processing at temperatures above approximately 220° C. It is contemplated that the material of the present invention can be used as a 25–65 wt % filler in a polymer system including latex, polypropylene, polyester, polyamide, polyurethane, polystyrene, PET, ethylene, low density polyethylene, ethylene-vinyl acetate, ethylene ethyl acrylate, nylon, polybutylene terephtalate, nylon-6, acrylonitrile-butadiene-styrene and other polymers.

It is intended that the above description is to be interpreted as being merely illustrative. The present invention is indicated by the broad general meaning of the terms in which the appended claims are expressed.

What is claimed is:

1. A method of producing a filler material for use as a 25–65 wt. % filler in a polymer system containing a polymer selected from the group consisting of latex, polypropylene, polyester, polyamide, polyurethane, polystyrene, PET, ethylene, low density polyethylene, ethylene-vinyl acetate, ethylene ethyl acrylate, nylon, polybutylene terephtalate, nylon-6, acrylonitrile-butadiene-styrene and polymers that require processing at temperatures above approximately 220° C., comprising the steps of:

(a) forming a substantially carbonate free aqueous slurry having a pH above about 13, said aqueous slurry comprising about 50–150 grams/liter $Al_2O_3$, about 5–100 grams/liter MgO, at least about 100 grams/liter NaOH and about 25–200 grams/liter NaBr; and (b) heating said slurry to a temperature greater than about 80° C. and less than about 150° C.

2. The method of claim 1 in which step (b) further includes heating said slurry to a temperature of less than about 150° C. for a period of about 30 to 180 minutes.

3. The method of claim 1 in which step (b) further includes heating said slurry under a pressure in the range of about 100 to 500 psi.

4. The method of claim 1 which further includes the steps of:

(c) filtering said slurry to form a filter cake comprising said anion substituted hydrotalcite.

5. The method of claim 1 which further includes the steps of:

(c) filtering said slurry to form a filter cake comprising said anion substituted hydrotalcite; and (d) rinsing said filter cake.

6. The method of claim 1 which further includes the steps of:

(c) filtering said slurry to form a filter cake comprising said anion substituted hydrotalcite;

(d) rinsing said filter cake;

(e) reslurrying said filter cake; and (f) spray drying said reslurry to form a high purity anion substituted hydrotalcite, said high purity being greater than about 90%.

7. A method as set forth in claim 1 wherein said heating step is performed at ambient pressure.

8. A method as set forth in claim 1 wherein said slurry comprises:

about 50–150 grams/liter $Al_2O_3$, about 5–100 grams/liter MgO, about 100–250 grams/liter NaOH, and about 25–200 grams/liter NaBr.

* * * * *